United States Patent
Wang et al.

(10) Patent No.: US 11,743,825 B2
(45) Date of Patent: Aug. 29, 2023

(54) USER EQUIPMENT LIMITED-SERVICE MODE

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 184 days.

(21) Appl. No.: 17/311,985

(22) PCT Filed: Dec. 13, 2019

(86) PCT No.: PCT/US2019/066172
§ 371 (c)(1),
(2) Date: Jun. 8, 2021

(87) PCT Pub. No.: WO2020/139583
PCT Pub. Date: Jul. 2, 2020

(65) Prior Publication Data
US 2022/0015036 A1 Jan. 13, 2022

Related U.S. Application Data

(60) Provisional application No. 62/786,197, filed on Dec. 28, 2018.

(51) Int. Cl.
*H04W 52/02* (2009.01)
*H04W 72/51* (2023.01)

(52) U.S. Cl.
CPC ..... *H04W 52/0235* (2013.01); *H04W 52/028* (2013.01); *H04W 52/0251* (2013.01); *H04W 72/51* (2023.01); *H04W 52/0229* (2013.01)

(58) Field of Classification Search
CPC . H04W 52/00; H04W 52/02; H04W 52/0209; H04W 52/0225; H04W 52/0235;
(Continued)

(56) References Cited

U.S. PATENT DOCUMENTS

| 8,917,661 B2 | 12/2014 | Hsu et al. |
| 9,369,892 B2 | 6/2016 | Patel et al. |

(Continued)

FOREIGN PATENT DOCUMENTS

| WO | 2018031327 | 2/2018 |
| WO | 2020139583 | 7/2020 |

OTHER PUBLICATIONS

"Foreign Office Action", IN Application No. 202147021270, dated Feb. 23, 2022, 5 pages.

(Continued)

*Primary Examiner* — Robert C Scheibel
(74) *Attorney, Agent, or Firm* — Colby Nipper PLLC

(57) ABSTRACT

The present disclosure describes systems and methods directed to a user equipment (UE) limited-service mode for wireless communications. For a user equipment (UE) that is wirelessly communicating with a base station, a service-mode manager determines that a thermal, power, or battery condition local to the UE violates a threshold and causes the UE to transmit a message that indicates a request by the UE to enter a UE limited-service mode. The base station allocates a set of resources of the air interface to be used for wireless communications upon the UE entering the UE limited-service mode. The base station then transmits a message to the UE, directing the UE to enter the UE limited-service mode and wirelessly communicate with the base station using the allocated set of resources of the air interface.

20 Claims, 8 Drawing Sheets

(58) Field of Classification Search
CPC .......... H04W 52/0251; H04W 52/028; H04W 52/0229; H04W 52/0261; H04W 72/51; Y02D 30/70
See application file for complete search history.

(56) References Cited

U.S. PATENT DOCUMENTS

| | | | |
|---|---|---|---|
| 9,398,520 | B2* | 7/2016 | Umatt ................... H04W 48/16 |
| 9,974,021 | B2 | 5/2018 | Devarayanigari et al. |
| 2004/0174833 | A1 | 9/2004 | Raith |
| 2010/0323743 | A1* | 12/2010 | Huan ................... H04W 52/367 |
| | | | 455/522 |
| 2013/0017851 | A1 | 1/2013 | Kim |
| 2014/0200685 | A1 | 7/2014 | Ngai et al. |
| 2016/0066279 | A1 | 3/2016 | Lee et al. |
| 2016/0262143 | A1* | 9/2016 | Breuer .............. H04W 52/0258 |
| 2017/0070894 | A1 | 3/2017 | Kumar et al. |
| 2019/0140722 | A1* | 5/2019 | Raghavan ............. H04W 72/23 |
| 2021/0195521 | A1* | 6/2021 | Müller .............. H04W 52/0219 |

OTHER PUBLICATIONS

"International Preliminary Report on Patentability", PCT Application No. PCT/US2019/066172, dated Dec. 16, 2020, 7 pages.
"International Search Report and Written Opinion", PCT Application No. PCT/US2019/066172, dated Apr. 17, 2020, 13 pages.
"User Equipment Procedures in Idle Mode and Procedures for Cell Reselection in Connected Mode", ETSI TS 125 304 V10.7.0, Jan. 2013, 54 pages.
Ghosh, "5G New Radio Design", Fall VTC, 2017, Panel, Sep. 25, 2017, Sep. 25, 2017, 20 pages.
Wu, "Handling Overheating in a Wireless-Communication Device", Technical Disclosure Commons, Jul. 12, 2019, 22 pages.

* cited by examiner

600

602
Receive, by a base station wirelessly attached to a UE using a first set of resources in response to the UE determining that a condition local to the user equipment violates a threshold, a first message indicating a request by the UE to enter a UE limited-service mode

604
Allocate, by the base station, a second set of resources to be used for wireless communications between the UE and the base station upon the UE entering the UE limited-service mode

606
Transmit, by the base station and to the UE, a second message that includes an LS-RNTI that identifies the allocated second set of resources and directs the UE to (i) enter the UE limited-service mode and (ii) wirelessly communicate with the base station using the allocated second set of resources

Fig. 6

USER EQUIPMENT LIMITED-SERVICE MODE

RELATED APPLICATION(S)

This application is a national stage entry of International Application No. PCT/US2019/066172, filed Dec. 13, 2019, which claims the benefit of U.S. Provisional Application No. 62/786,197, filed Dec. 28, 2018, the disclosures which are incorporated herein by reference in their entirety.

BACKGROUND

While performing wireless communications with a base station, a user equipment (UE) may experience conditions detrimental to the wireless communications or the UE. As an example, a smartphone performing high-bandwidth data transmission to a base station in accordance with Fifth-Generation new radio (5GNR) protocols may experience a peak-to-average power ratio (PAPR) that changes a thermal condition local to the smartphone. If the thermal condition violates a temperature rating for components of the smartphone, components of the smartphone may deteriorate and shorten the smartphone's useful life. As another example, while the smartphone is performing the high-bandwidth data transmissions, electrical current draw may be such that a power or battery condition local to the smartphone violates a respective thermal, power, or battery condition threshold, causing the smartphone to power off or terminate wireless communications with the base station.

In some instances, a desirable state may include the UE maintaining a consistent attachment with a base station. As a first example, the UE may scan a search space, as defined by resource elements corresponding to frequency and time domains of an air interface, for a message from the base station that includes downlink control information (DCI) necessary for the UE to receive a critical command. During an interrupted wireless radio link, the UE may have an intermittent knowledge of the search space, causing the UE to scan an excessive number of resource elements of the air interface when the wireless radio link resumes, leading to inefficiencies in scanning operations. As another example, the UE may transmit high-priority data to a core network or another UE, where interrupted wireless communications would compromise the user device's effectiveness in transmitting the high-priority data.

Systems and methods, as implemented today and noted above, may compromise the effectiveness and efficiency with which the UE operates. Opportunities are available to improve current systems and methods for managing wireless radio links between the UE and the base station in response to a thermal, battery, or power condition local to the UE.

SUMMARY

This document describes systems and methods directed to a UE limited-service mode. For a user equipment (UE) that is wirelessly linked with a base station, the UE may transmit a first message that indicates a request to enter a UE limited-service mode. The base station allocates a second set of resources of the air interface to be used for a radio link upon the UE entering the UE limited-service mode. The base station then transmits a second message to the UE that directs the UE to enter the UE limited-service mode and wirelessly communicate with the base station using the allocated second set of resources of the air interface.

Some aspects describe a method performed by a user equipment (UE) wirelessly attached to a base station using a first set of resources of an air interface. The method includes the UE determining that a condition that is local to the UE violates a threshold and the UE transmitting, to the base station, a first message. The first message indicates to the base station a request by the UE to enter a UE limited-service mode. The UE then receives, from the base station, a second message that includes a limited-service radio network temporary identifier that identifies an allocated second set of resources of the air interface and directs the UE to (i) enter the UE limited-service mode and (ii) wirelessly communication with the base station using the allocated second set of resources of the air interface.

Other aspects describe a method performed by a base station wirelessly attached to a user equipment (UE) using a first set of resources of an air interface. The method includes the base station receiving, from the UE in response to the UE determining that a condition that is local to the UE violates a threshold, a first message that indicates to the base station a request by the UE to enter a UE limited-service mode. The base station then allocates a second set of resources of the air interface to be used between the UE and the base station upon the UE entering the UE limited-service mode. The method continues, where the base station transmits, to the UE, a second message that directs the UE to enter the UE limited-service mode and wirelessly communicate with the base station using the allocated second set of resources of the air interface.

The details of one or more implementations are set forth in the accompanying drawings and the following description. Other features and advantages will be apparent from the description and drawings, and from the claims. This summary introduces subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of a UE limited-service mode is described below. The use of the same reference numbers in different instances in the description and the figures indicate like elements.

FIG. 6 illustrates an example method performed by a base station in accordance with one or more aspects of a UE limited-service mode.

The following discussion describes an operating environment implementing a UE limited-service mode. In the context of the present disclosure, reference is made to the operating environment by way of example only.

Operating Environment

Figure 1:
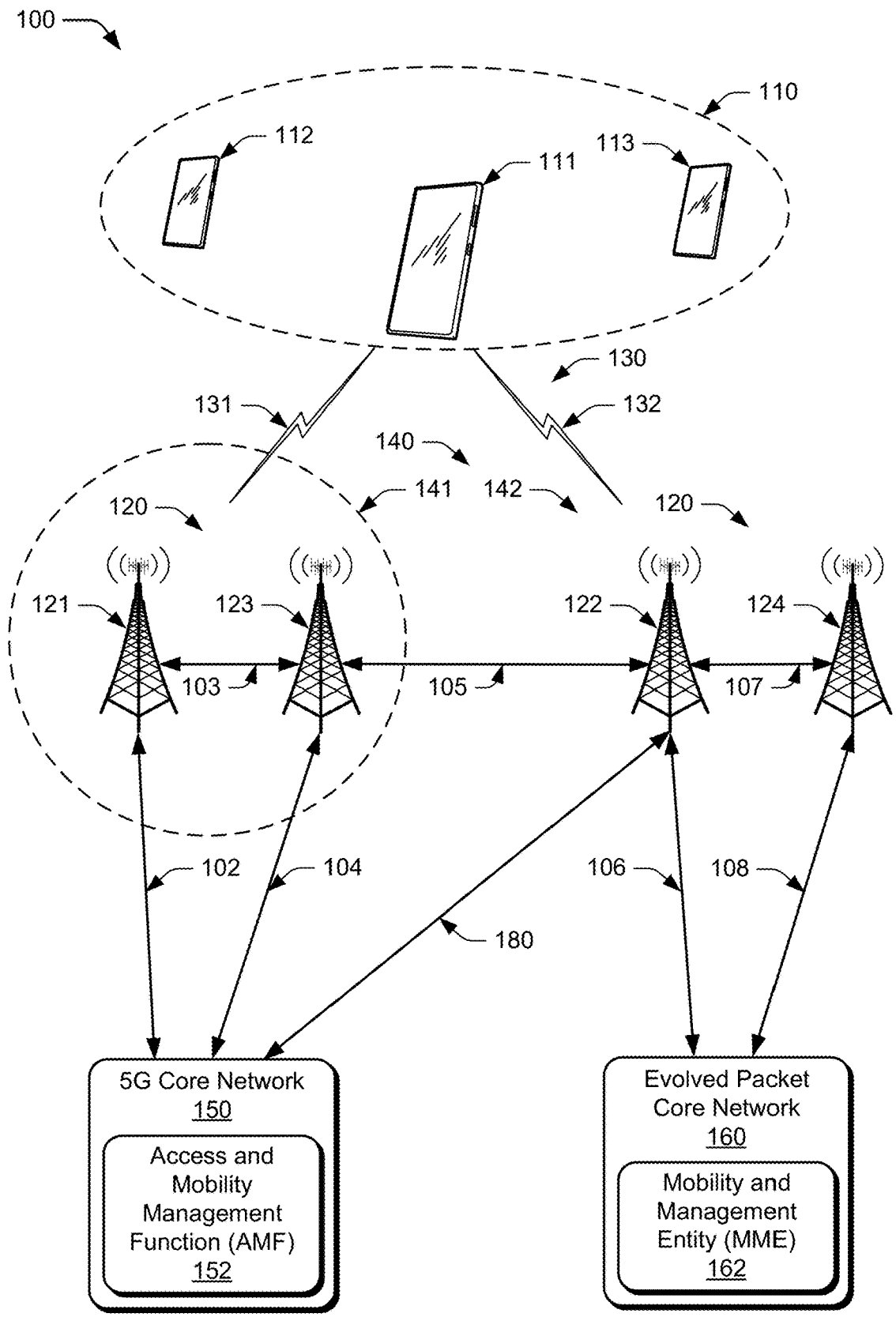
FIG. 1 illustrates an example operating environment in accordance with one or more aspects of a UE limited-service mode.

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate using an Xn Application Protocol (XnAP) through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

In certain instances, the UE 110 may be wirelessly communicating using the wireless link 130 with the base station 120 and determine that a condition local to the UE 110 violates a threshold (e.g., thermal condition, power condition, battery condition). As an example, functions supporting a high-bandwidth data transfer by way of the wireless link 130 utilizing a first set of resources (e.g., resources defined by frequency and time domains of an air interface) may consume a high electrical current and dissipate a large amount of power local to the UE 110 in the form of heat. Due to thermal characteristics of the UE 110, a semiconductor device of the UE 110 (e.g., a processor, a transceiver, a controller, a memory device) may exceed an allowable junction temperature threshold and shorten the useful life of the semiconductor device. Furthermore, and addition to the high electrical current consumption causing the junction temperature threshold violation, the high electrical current consumption may draw down power stored in a battery of the UE 110, causing the UE 110 to terminate wireless communications with the base station 120.

In such instances, it may be beneficial for the UE 110 to enter a UE limited-service mode that reduces the electrical current draw. To enter the UE limited-service mode, the UE 110 may transmit to another apparatus (e.g., the base station 120 or, alternatively, a controller in a core network) a first message to initiate a transition by UE 110 into the UE limited-service mode. In response to the receiving the first message from the UE 110, the apparatus (e.g., the base station 120 or the controller of the core network) may perform operations that include sending a second message to the UE 110 that directs the UE 110 to enter the UE limited-service mode and communicate with the base station 120 utilizing a reduced set of resources (e.g., resources of an air interfaces), having the effect of lowering electrical current consumption of the UE 110.

The second message may include information the UE 110 utilizes to configure wireless-communication hardware of the UE 110 for it to wirelessly communicate with the base station 120 in the UE limited-service mode using the reduced set of resources. As an example, the information may include a limited-service radio network temporary identifier (LS-RNTI), a numerology and a waveform format, or an identity of a beam.

The first and second messages may be transmitted using protocols defined for layers of a wireless networking stack used by the UE 110, the base station 120, and the controller of the core network. In certain instances, the protocols may correspond to protocols associated with a medium access control (MAC) layer, a radio resource control (RRC) layer, or a Non-Access Stratum (NAS) layer.

Example Systems

Figure 2:
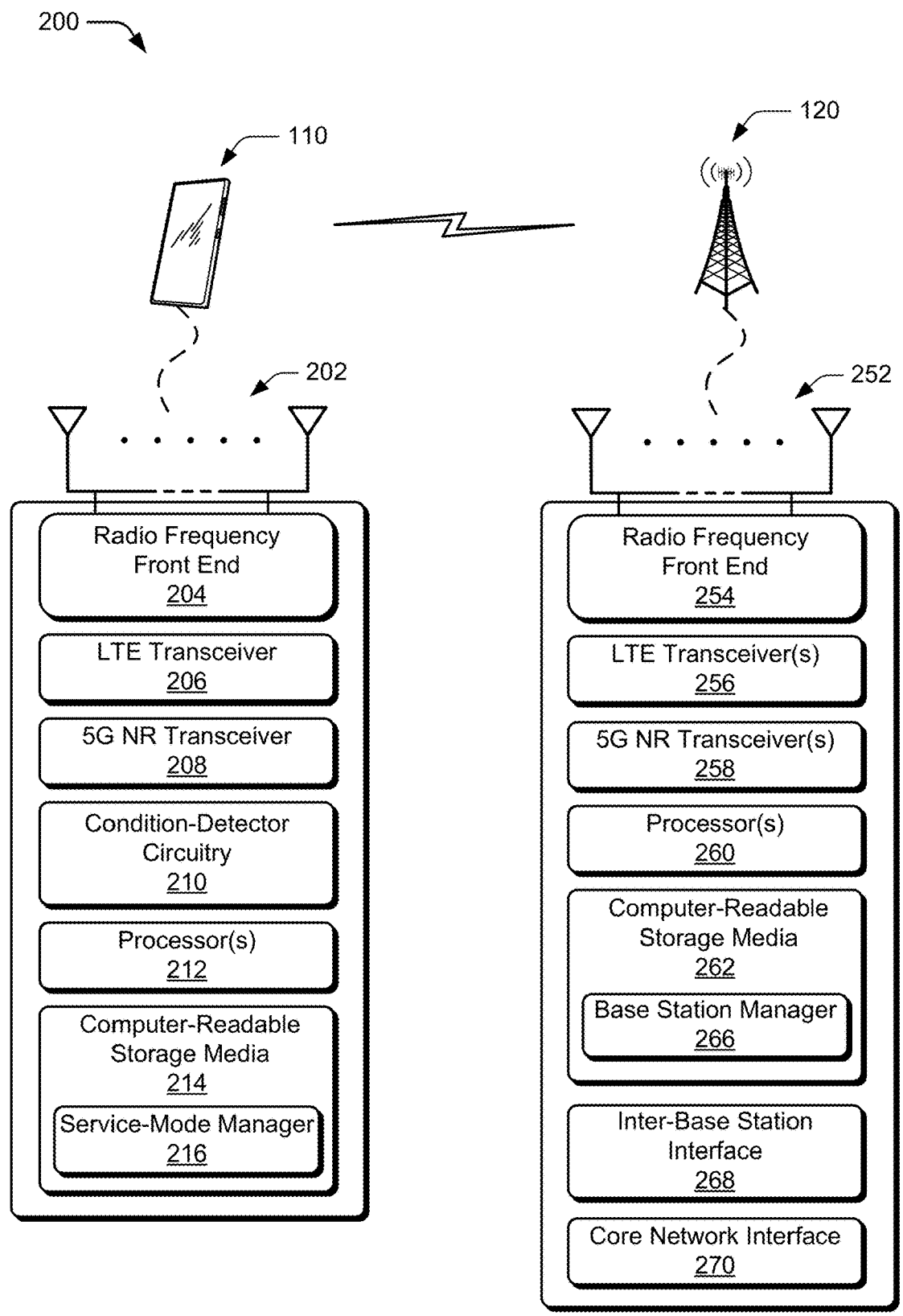
FIG. 2 illustrates example device diagrams in accordance with one or more aspects a UE limited-service mode.

FIG. 2 illustrates an example device diagram 200 of the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes condition-detector circuitry 210 for detection of conditions local to the UE and to aid in the determination of a thermal, power, and/or battery condition that is local to the UE. The condition-detector circuitry 210 may include circuitry such as sensors that detect one or more temperatures of the UE 110, and/or circuitry that detects an electrical current draw of the UE 110, or circuitry that detects an electrical charge or potential of a battery of the UE 110.

The UE 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. The CRM 214 may include any suitable memory or storage device such as random-access memory (RAM), static RAM (SRAM), dynamic RAM (DRAM), non-volatile RAM (NVRAM), read-only memory (ROM), or Flash memory.

The CRM 214 also includes a service-mode manager 216 having executable code. Alternately or additionally, the service-mode manager 216 may be implemented in whole or part as hardware logic or circuitry integrated with or separate from other components of the UE 110. In at least some aspects, executing the code of the service-mode manager 216 configures the RF front end 204, the LTE transceiver 206, the 5G NR transceiver 208, and/or the condition-detector circuitry 210 to implement the techniques for the UE limited-service mode described herein.

In some instances, a System-on-Chip (SoC) may physically combine one or more elements of the UE 110. As an example, the SoC may include the condition-detector circuitry 210, the CRM 214, the LTE transceiver 206, and the 5G NR transceiver 208.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (the CRM 262). The processor 260 may be a single core processor or a multiple core processor composed of a variety of materials, such as silicon, polysilicon, high-K dielectric, copper, and so on. The CRM 262 may include any suitable memory or storage device such as random-access memory (RAM), static RAM (SRAM), dynamic RAM (DRAM), non-volatile RAM (NVRAM), read-only memory (ROM), or Flash memory.

The CRM 262 also includes a base station manager 266 having executable code. Alternately or additionally, the base station manager 266 may be implemented in whole or part as hardware logic or circuitry integrated with or separate from other components of the base stations 120. In at least some aspects, executing the code of the base station manager 266 may allocate resources of a radio access network (e.g., resources corresponding to an air interface that conforms to a 3GPP LTE or a 5G NR wireless-communication protocol standard) and also configure the LTE transceivers 256 and the 5G NR transceivers 258 for communication with the UE 110 in accordance with the UE limited-service mode described herein.

The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Figure 3:
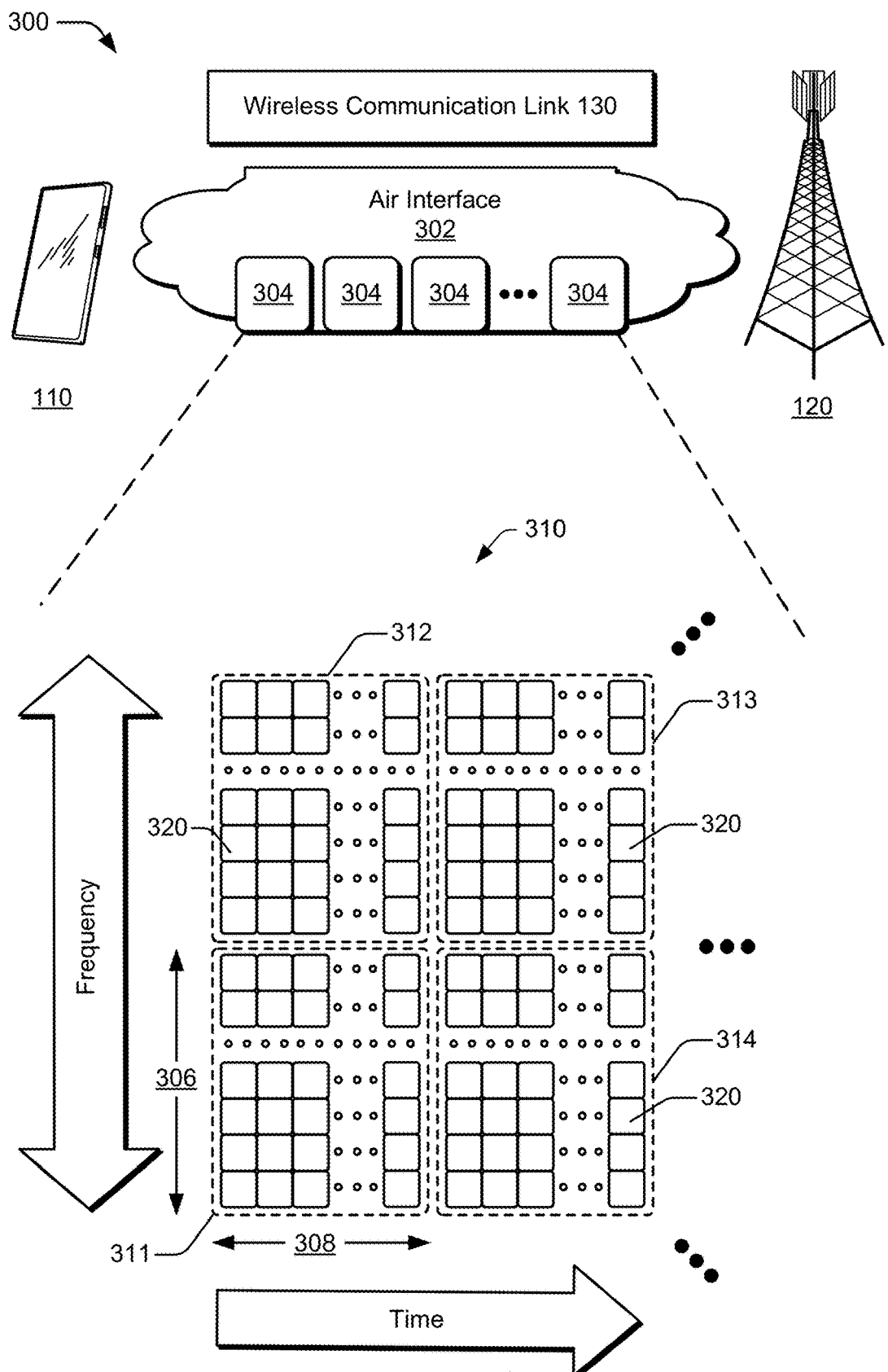
FIG. 3 illustrates example details of an air interface in accordance with one or more aspects a UE limited-service mode.

FIG. 3 illustrates example details 300 of an air interface in accordance with one or more aspects a UE limited-service mode. The air interface 302 can be divided into resource units 304, each of which occupies some intersection of frequency spectrum and elapsed time. A portion of the air interface 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base station 120 allocates portions (e.g., resource units 304) of the air interface 302 for uplink and downlink communications. Each resource block 310 of network access resources may be allocated to support respective wireless-communication link 130 of multiple UE 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, the UE 110 may communicate with the base station 120 using sets of resources allocated to respective channels of a wireless networking stack. Furthermore, and in some instances, allocations to the respective channels may vary. For example, the UE 110 may wirelessly communicate with the base station 120 using a first set of resources that spans a first frequency range and has a first frequency bandwidth. While in the UE limited-service mode, however, the UE 110 may wirelessly communicate with the base station 120 using a second set of resources that spans a second frequency range that is lower than the first frequency range and that has a second frequency bandwidth that is less than the first frequency bandwidth.

Figure 4:
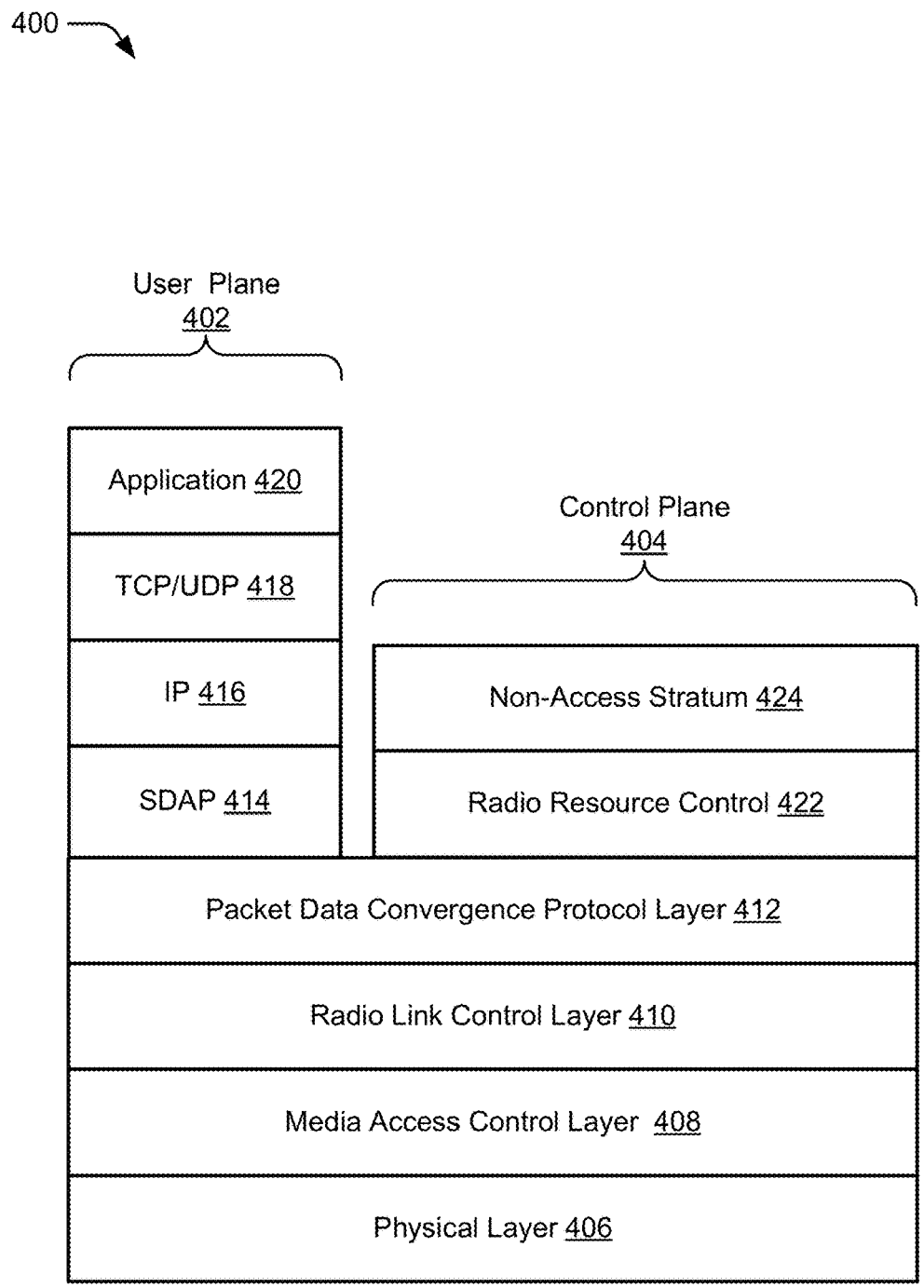
FIG. 4 illustrates an example wireless network stack with which various aspects of a UE limited-service mode.

FIG. 4 illustrates an example wireless network stack 400 with which various aspects of a UE limited-service mode can be implemented. The wireless network stack 400 includes a user plane 402 and a control plane 404. Upper layers of the user plane 402 and the control plane 404, share common lower layers in the wireless network stack 400. Wireless devices such as the UE 110 or base stations 120 implement each layer as an entity for communication with another device using the protocols defined for the layer.

The shared lower layers include a physical layer 406 (PHY layer 406), a Media Access Control layer 408 (MAC layer 408), a Radio Link Control layer 410 (RLC layer 410), and a Packet Data Convergence Protocol layer 412 (PDCP layer 412). The physical layer 406 provides hardware specifications for devices that communicate with each other. As such, the physical layer 406 establishes how devices connect to each other, assists in managing how communication resources are shared among devices, and the like.

The MAC layer 408 specifies how data is transferred between devices. Generally, the MAC layer 408 provides a way in which data packets being transmitted are encoded and decoded into bits as part of a transmission protocol.

The RLC layer 410 provides data transfer services to higher layers in the wireless network stack 400. Generally, the RLC layer 410 provides error correction, packet segmentation and reassembly, and management of data transfers in various modes, such as acknowledged, unacknowledged, or transparent modes.

The PDCP layer 412 provides data transfer services to higher layers in the wireless network stack 400. Generally, the PDCP layer 412 provides transfer of user plane 402 and control plane 404 data, header compression, ciphering, and integrity protection.

Above the PDCP layer 412, the wireless network stack splits into the user-plane 402 and the control plane 404. The user plane 402 layers include an optional Service Data Adaptation Protocol layer 414 (SDAP 414), an Internet Protocol layer 416 (IP 416), a Transmission Control Protocol/User Datagram Protocol layer 418 (TCP/UDP 418), and an application 420 for transferring data. The optional SDAP layer 414 is present in 5G NR networks and maps a Quality of Service (QoS) flow for each data radio bearer and marks QoS flow identifiers in uplink and downlink data packets for each packet data session. The IP layer 416 specifies how the data from the application 420 is transferred to a destination node. The TCP/UDP layer 418 is used to verify that data packets intended to be transferred to the destination node reached the destination node, using either TCP or UDP for data transfers by the application 420.

The control plane 404 includes a Radio Resource Control 422 (RRC 422) layer and a Non-Access Stratum 424 (NAS 424) layer. The RRC 422 establishes and releases connections and radio bearers, broadcasts system information, performs power control, and so forth. The NAS 424 provides support for mobility management and packet data bearer contexts between the UE 110 and entities or functions in the core network.

In the UE 110, each layer in both the user plane 402 and the control plane 404 of the wireless network stack 400 interacts with a corresponding peer layer or entity in a base station 120, a core network entity or function, and/or a remote service, to support user applications and control operation of the UE 110 in a radio access network.

Example Methods

Example methods 500 and 600 are described with reference to FIGS. 5 and 6 in accordance with one or more aspects of a UE limited-service mode. The order in which the method blocks are described are not intended to be construed as a limitation, and any number of the described method blocks can be combined in any order or skipped to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
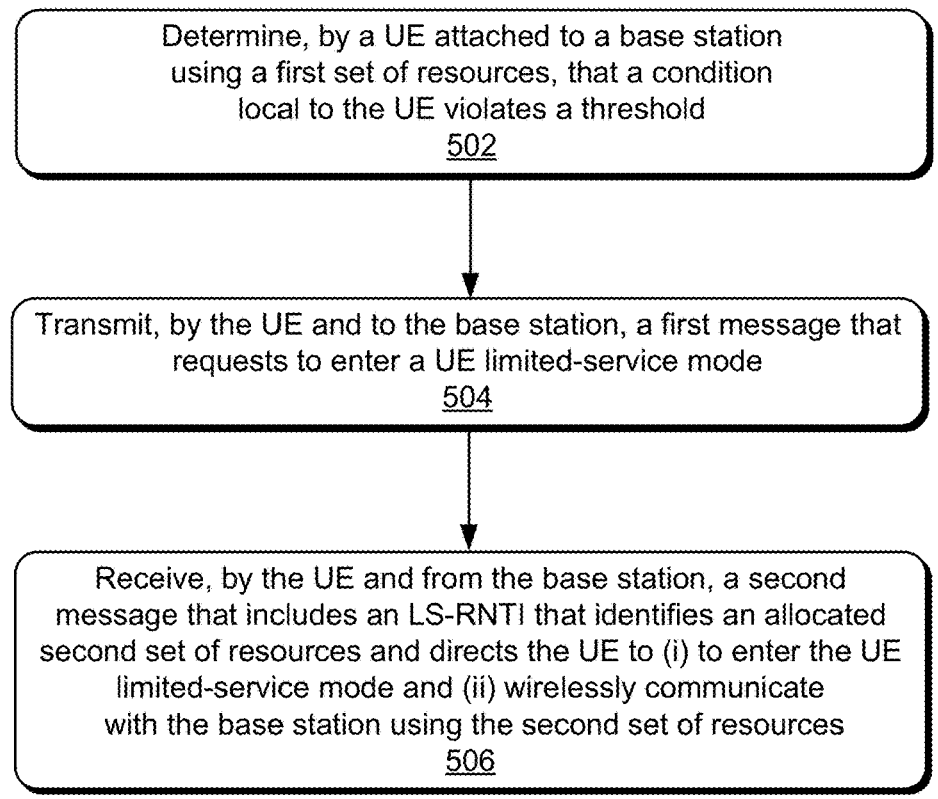
FIG. 5 illustrates an example method performed by a UE in accordance with one or more aspects of a UE limited-service mode.

FIG. 5 illustrates an example method 500 performed by a UE in accordance with one or more aspects of a UE limited-service mode. The method 500 may be performed by the UE 110 wirelessly communicating with the base station 120 using a first set of resources of an air interface (e.g., the air interface 302). In some instances, the UE and the base station may be wirelessly communicating in accordance with a Third-Generation Partnership Project Long-Term Evolution (3GPP LTE), Fifth-Generation New Radio (5G NR), or Sixth-Generation (6G) wireless-communication protocol. The base station may perform operations of managing resources (e.g., the resource units 304) used for a radio link between the UE and the base station.

At operation 502, the UE determines that a condition that is local to the UE violates a threshold. Such a determination may made by the processor 212 executing the code of the service-mode manager 216, using measurements made by the condition-detector circuitry 210. The UE may be attached to the base station and, in some instances, wirelessly communicate with the base station.

In some instances, the condition may be a thermal, power, or battery condition resulting from the UE transmitting data to the base station. In other instances, the condition may be a thermal, power, or battery condition that is a result of playing a game on the UE, playing media content stored on the UE, or running an application that does not require wireless communication with the base station.

At operation 504, the UE transmits to the base station a first message that indicates to the base station a request to enter a UE limited-service mode. The first message causes the base station (e.g., processor 260 executing the code of the base station manager 266) to allocate a second set of resources to be used for a radio link between the UE and the base station upon the UE entering the UE limited-service mode and may, in some instances, include an allocation of a random access channel (RACH) sequence. The first message may be transmitted in accordance with a medium access control (MAC) layer 408 protocol or a radio resource control (RRC) layer 422 protocol.

At operation 506 the UE receives, from the base station, a second message that includes a limited-service radio network temporary identifier (LS-RNTI) that identifies an allocated second set of resources of the air interface. The second message directs the UE to enter the UE limited-service mode and wirelessly communicate with the base station using the allocated second set of resources of the air interface and, in some instances, utilizing a contention-free random access channel (RACH) in accordance with an allocated RACH sequence. The second message may be received in accordance with a medium access control (MAC) layer 408 protocol or a radio resource control (RRC) layer 422 protocol.

In general, and as part of the method 500, the first set of resources and the allocated second set of resources may be associated with a channel defined by a wireless-communication protocol. Furthermore, the allocated second set of resources may be altered in comparison to the first set of resources. As a first example, the first set of resources and the allocated second set of resources may be resources of a transport channel, where the allocated second set of resources has a smaller frequency bandwidth than the first set of resources. In this first example, wirelessly communicating with the base station using the allocated second set of resources of the air interface may include the UE transmitting uplink data to, and receiving downlink data from, the base station. In general, each of the described allocations are by way of example only and can be performed individually or in combination with other allocations of other channels.

As a second example, the first set of resources and the allocated second set of resources may be resources of a control channel, where the allocated second set of resources has a smaller frequency bandwidth and a more-limited search space than the first set of resources. In this second example, wirelessly communicating with the base station using the allocated second set of resources of the air interface may include the UE monitoring the allocated second set of resources of the air interface for a unicast message from the base station to the UE. While monitoring such an allocated second set of resources (having a smaller frequency bandwidth and a more-limited search space than the first set of resources), the UE may utilize a lower clock rate and expend less power.

The second message may include wireless-communication parameters such as a numerology or a waveform format for use by the UE and the base station while the UE is in the UE limited-service mode. In an instance where the second message includes a numerology, the numerology may correspond to a Fast Fourier Transform (FFT) size that becomes smaller upon the UE entering the UE limited-service mode which, in turn, reduces processing power expended by the UE. In an instance where the second message includes a waveform format, the waveform format may have a peak-to-average ratio that reduces power consumption by the UE.

The second message may also include wireless-communication parameters corresponding to identities of beams for wireless communications while the UE is in the UE limited-service mode. Such identities, in certain instances, may identify beams that provide wider coverage than other beams used by the UE and the base station before the UE entered the UE limited-service mode. When equipped with the identities of the beams that provide the wider coverage, the UE may search or locate a beam more quickly which, in turn, reduces a power consumption of the UE.

The second message may also include wireless-communication parameters corresponding to a random access channel (RACH) sequence. The RACH sequence may be a contention-free RACH sequence that reduces power consumed by the UE. While the UE is in the UE limited-service mode, the UE may transmit (and receive) data in accordance with the different types of wireless-communication parameters included in the second message. In general, each of the described wireless-communication parameters are by way of example only and can be included in the second message individually or in combination with each of the other described wireless-communication parameters.

FIG. 6 illustrates an example method 600 performed by a base station in accordance with one or more aspects of a UE limited-service mode. The method 600 may be performed by the base station 120 wirelessly communicating with the UE 110 using a first set of resources of an air interface (e.g., the air interface 302). In some instances, the base station and the UE wirelessly communicate in accordance with a Third-Generation Partnership Project Long-Term Evolution (3GPP LTE), Fifth-Generation New Radio (5G NR), or Sixth-Generation (6G) wireless-communication protocol. The base station may perform operations that manage resources of the air interface 302 (e.g., the resource units 304) used for a radio link between the UE and the base station.

At operation 602, the base station receives, from the UE, a first message that indicates to the base station a request to enter a UE limited-service mode. At operation 604, the base station (e.g., the processor 260 executing the code of the base station manager 266) allocates a second set of resources to be used for a radio link between the UE and the base station upon the UE entering the UE limited-service mode. The first message may be transmitted in accordance with a medium access control (MAC) layer 408 protocol or a radio resource control (RRC) layer 422 protocol. The allocated second set of resources lower power consumption of the UE through having, for example, a smaller frequency bandwidth than the first set of resources, a smaller Fast Fourier Transform size than the first set of resources, or transmission time intervals that are greater than the first set of resources.

Furthermore, and as part of the method 600, the second message may include different types of wireless-communication parameters that may be used by the UE and the base station for wirelessly communicating while the UE is in the UE limited-service mode. A first example of wireless-communication parameters included in the second message is a limited-service radio network temporary identifier (LS-RNTI) that identifies the allocated second set of resources of the air interface. A second example of wireless-communication parameters included in the second message are identities of beams for wireless communications while the UE is in the UE limited-service mode. A third example of wireless-communication parameters included in the second message is a numerology and a waveform format for use by the UE and the base station while the UE is in the UE limited-service mode.

In general, the example methods 500 and 600 are in the context of the base station 120 performing resource allocation operations as part of alleviating a power, thermal, or battery condition local to the UE 110. However, an apparatus that is other than the base station 120 may perform such resource allocation operations in lieu of the base station 120. As an example, a controller associated with a core network (e.g., the 5GC 150 of FIG. 1) may, in response to receiving a request from the UE (e.g., via a message received from the UE in accordance with a Non-Access Stratum (NAS) layer 424 protocol), allocate the second set of resources to be used by the UE and the base station after the UE enters the UE limited-service mode. In addition to allocating the second set of resources to alleviate the power, thermal, or battery condition local to the UE, the core network may prioritize and regulate messages transmitted to the UE after the UE enters the UE limited-service mode. This is effective to reduce wireless communications to the UE and alleviate the power, thermal, or battery condition even further.

Example Signaling and Control Transactions

Figure 7:
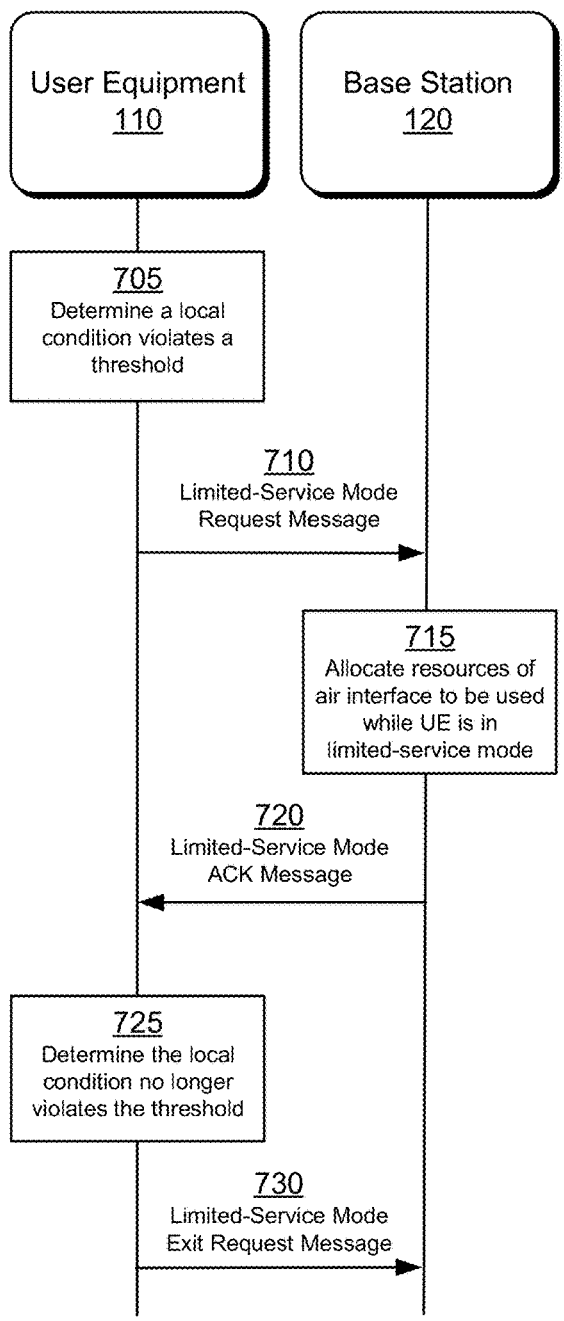
FIG. 7 illustrates an example of signal and control transactions associated with various aspects of a UE limited-service mode.

FIG. 7 illustrates details 700 of example signaling and control transactions associated with various aspects of a UE limited-service mode. Although multiple combinations and permutations of the UE limited-service mode are possible, FIG. 7 is illustrated in the context of a UE (e.g., the UE 110) communicating with a base station (e.g., the base station 120) that allocates the resources of an air interface (e.g., the air interface 302) to be used for a radio link between the base station 120 and the UE 110 after the UE 110 enters the UE limited-service mode. The UE 110 and the base station 120 may perform the signaling and control actions using protocols associated with layers included in a wireless network stack (examples of which include protocols that may be associated with the MAC layer 408 or the RRC layer 422 of the wireless network stack 400).

At 710, and after determining a thermal, power, or battery condition local to the UE 110 violates a respective thermal, power, or battery condition threshold at 705, the UE 110 transmits, to the base station 120, a first message that indicates to the base station 120 a request by the UE 110 to enter a UE limited-service mode. Although illustrated at 710 as single message, the first message may be multiple messages or a combination of messages. The message(s) may specify the violated threshold (e.g., thermal, power, or battery) and/or the violation amount (e.g., 101% or 110% of the thermal threshold, 100% or 120% of the PAPR threshold, the remaining battery life estimate when it dips below a 15% threshold).

At 715, the base station 120 allocates resources of the air interface 302 to be used for a radio link between the base station 120 and the UE 110 after the UE 110 enters the UE limited-service mode. The allocated resources of the air interface 302 may impact wireless communications between the UE 110 and the base station 120 in several aspects that include, for example, the UE 110 communicating with the base station 120 using a smaller frequency bandwidth, using a lower frequency assignment, using a lower clock rate, or using wider beams, one or more of which may lower the power consumption of the UE 110.

At 720, the base station 120 transmits a second message to the UE 110. The second message, e.g., a UE limited-service mode acknowledgment (ACK) message, directs the UE 110 to enter the UE limited-service mode in accordance with wireless-communication parameters included in the second message. Although illustrated at 720 as single message, the second message may be multiple messages or a combination of messages.

Such wireless-communication parameters may include a limited-service radio network temporary identifier (LS-RNTI), a numerology and a waveform format, identities of beams for wireless communications, and/or a random access channel (RACH) sequence. The UE 110 may use the wireless-communication parameters, either individually or in one of multiple possible combinations, to wirelessly communicate with the base station 120 after the UE 110 enters the UE limited-service mode.

Additional signaling and control transactions may occur that enable the UE 110 to exit a UE limited-service mode. For example, at 730 and after the UE 110 determines at 725 that the thermal, power, or battery condition no longer violates the respective threshold, a third message, e.g., a request message to exit the UE limited-service mode, may be sent to the base station 120 (after which the base station 120 may allocate resources without regard to the UE limited-service mode).

Figure 8:
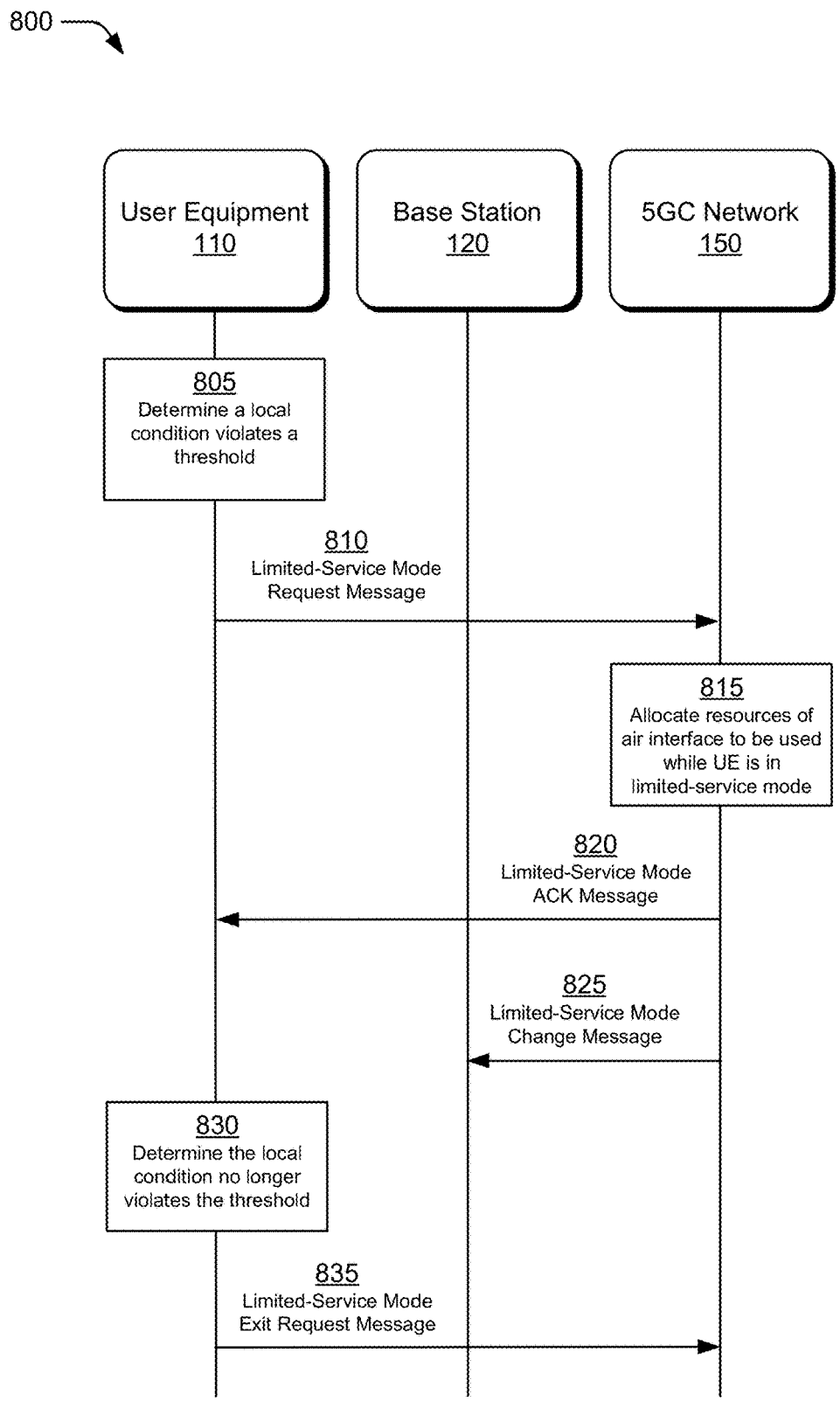
FIG. 8 illustrates another example of signal and control transactions associated with various aspects of a UE limited-service mode.

FIG. 8 illustrates details 800 of example signaling and control transactions associated with various aspects of a UE limited-service mode. Although multiple combinations and permutations of the UE limited-service mode are possible, FIG. 8 is illustrated in the context of a UE (e.g., the UE 110) communicating with a core network (e.g., the 5GC 150 network of FIG. 1), wherein the 5GC 150 network allocates the resources of an air interface (e.g., the air interface 302) to be used for a radio link between the base station 120 and the UE 110 after the UE 110 enters the UE limited-service mode. The signaling and control actions may use protocols associated with layers included in a wireless network stack (examples of which include protocols that associated with the NAS layer 424 of the wireless network stack 400 of FIG. 4).

At 810, and after determining a thermal, power, or battery condition local to the UE 110 violates a respective thermal, power, or battery condition threshold at 805, the UE 110 transmits, through the base station 120 and to the 5GC network 150, a first message that indicates to the 5GC network 150 a request by the UE 110 to enter a limited service-mode. Although illustrated at 810 as single message, the first message may be multiple messages or a combination of messages. The message(s) may specify the violated threshold parameter (e.g., thermal, power, or battery) and, optionally, a current value of the parameter.

At 815, the 5GC network 150 allocates resources of the air interface 302 to be used for a radio link between the base station 120 and the UE 110 after the UE 110 enters the UE limited-service mode. The allocated resources of the air interface 302 may impact wireless communications between the UE 110 and the base station 120 in several aspects that include, for example, the UE 110 communicating with the base station 120 using a smaller frequency bandwidth, using a lower frequency assignment, using a lower clock rate, or using wider beams, one or more of which may lower the power consumption of the UE 110.

The 5GC network 150, in certain instances, may have an advantage over a base station for allocating resources for communicating internet protocol (IP) traffic. Such an advantage may be realized through the 5GC network 150 having a comprehensive view of multiple base stations of the 5GC network 150, aggregate traffic of the 5GC network 150 network, and so on.

At 820, the 5GC network 150 transmits, through the base station 120, a second message to the UE 110. The second message, a UE limited-service mode acknowledgement (ACK) message, directs the UE 110 to enter the UE limited-service mode in accordance with wireless-communication parameters included in the second message. Such wireless-communication parameters may include a limited-service radio network temporary identifier (LS-RNTI), a numerology and a waveform format, identities of beams for wireless communications, or a random access channel (RACH) sequence. Although illustrated at 804 as a single message, the second message may be multiple messages or a combination of messages.

At 825 the 5GC network 150 transmits a third message, a UE limited-service mode change message, to the base station 120. The third message may include the same wireless-communication parameters as included in the second message so that the base station 120 may align with the UE 110 with respect to resources and wireless-communication parameters for wireless communications between the base station 120 and the UE 110 after the UE 110 enters the UE limited-service mode.

Additional signaling and control transactions may occur that enable the UE 110 to exit UE limited-service mode. For example, at 835 and after the UE 110 determines at 830 that the thermal, power, or batter condition no longer violates the threshold, a fourth message, e.g., a request message to exit the UE limited-service mode, may be sent to the 5GC network 150 (after which the 5GC network 150 may allocate resources that without regarding to supporting the UE limited-service mode).

The described signaling and control transactions are by way of example only and are not constrained by the sequence or order of presentation unless otherwise noted. Furthermore, in certain aspects, additional signaling and control transactions may augment or replace the described signaling and control transactions.

Variations

Variations and permutations of the aforementioned methods and systems are many. Consider a first example variation, in which a UE is dually connected to a base station using a 3GPP LTE wireless link and a 5G NR wireless link. Using variations of the aforementioned methods and systems, the UE may enter a UE limited-service mode using one of the connections (e.g., using the 5G NR wireless link) without requesting a UE limited-service mode using the other connection (e.g., using the 3GPP LTE wireless link).

A second example variation includes additional different types of wireless-communication parameters that may be used by the UE and the base station for wirelessly communicating while the UE is in the UE limited-service mode. Such additional different types of wireless-communication parameters may include wireless-communication parameters applicable to discrete Fourier transform/orthogonal frequency division multiplexing (DFT-S-OFDM), transmission-time intervals (TTIs), uplink transmission power settings of the UE, or time windows available to the UE for operating in the UE limited-service mode.

A third example variation includes manual triggering of the UE limited-service mode by a user of the UE. In such an instance, and as opposed to the service-mode manager determining a violation of a thermal, power, or battery condition, a user may select (through a selectable user interface) the UE limited-service mode and trigger a request to the base station.

A fourth example variation includes the base station over-allocating resources to the UE. In such an instance, the UE may select a subset of the over-allocated resources to use while in the UE limited-service mode.

A fifth example variation includes a first additional method performed by a UE attached to a base station using a first set of resources of an air interface. The first additional method comprises determining, by the UE, that a thermal, power, or battery condition that is local to the UE violates a threshold. The first additional method also comprises transmitting, by the UE and to the base station, a first message that requests to enter a UE limited-service mode and receiving, by the UE and from the base station, a second message specifying an allocated second set of resources of the air interface. The first additional method includes directing the UE to enter the UE limited-service mode and wirelessly communicate with the base station by using the allocated second set of resources of the air interface. As part of the first additional method, the UE and the base station operate in accordance with a Third-Generation Partnership Project Long-Term Evolution (3GPP LTE), Fifth-Generation New Radio (5G NR), or Sixth-Generation (6G) wireless-communication protocol. Also as part of the first additional method, the first message is transmitted in accordance with a medium access control (MAC) layer protocol or a radio resource control (RRC) layer protocol and the second message is received in accordance with a medium access control (MAC) layer protocol or a radio resource control (RRC) layer protocol.

A sixth example variation includes a second additional method performed by a UE attached to a base station using a first set of resources of an air interface. The second additional method comprises determining, by the UE, that a thermal, power, or battery condition that is local to the UE violates a threshold. The second additional method also comprises transmitting, by the UE and to the base station, a first message that requests to enter a UE limited-service mode and receiving, by the UE and from the base station, a second message specifying an allocated second set of resources of the air interface. The second additional method includes directing the UE to enter the UE limited-service mode and wirelessly communicate with the base station by using the allocated second set of resources of the air interface. As part of the second additional method, wirelessly communicating with the base station using the allocated second set of resources of the air interface includes monitoring the allocated second set of resources for a unicast message from the base station to the UE.

A seventh example variation includes a third additional method performed by a base station wirelessly attached to a UE using a first set of resources of an air interface. The method comprises receiving, by the base station and from the UE in response to the UE determining that a thermal, power, or battery condition that is local to the UE violates a threshold, a first message indicating a request by the UE to enter a UE limited-service mode. The third additional method includes allocating, by the base station, a second set of resources of the air interface to be used for a radio link between the UE and the base station upon the UE entering the UE limited-service mode and transmitting, by the base station and to the UE, a second message. The second message directs the UE to enter the UE limited-service mode and wirelessly communicate with the base station using the allocated second set of resources of the air interface. As part of the third example method, the base station and the UE wirelessly communicate in accordance with a Third-Generation Partnership Project Long-Term Evolution (3GPP LTE), Fifth-Generation New Radio (5G NR), or Sixth-Generation (6G) wireless-communication protocol. Also as part of the third example method, the first and second messages are transmitted in accordance with a medium access control (MAC) layer protocol or a radio resource control (RRC) layer protocol.

An eighth example variation includes another UE that includes detection circuitry, a wireless-communication transceiver, a processor, and a computer-readable storage media. The computer-storage media comprises a service-mode manager application having instructions that, upon execution by the processor, cause the UE to determine, using the detection circuitry, that a thermal, power, or battery condition local to the UE violates a threshold and transmit, using the wireless-communication transceiver and through a base station to a core network, a first message that (i) indicates to the core network a request by the another UE to enter a UE limited-service mode and (ii) directs the core network to determine a second set of resources of the air interface to be used for a radio link between the UE and a base station of the core network upon the UE entering the UE limited-service mode The another UE also receives, using the wireless-communication transceiver, a second message that specifies an allocated second set of resources of the air interface and directs the UE to enter the UE limited-service mode and wirelessly-communicate with the base station of the core network using the second set of resources of the air interface. The first message and the second message are transmitted in accordance with a non-access stratum (NAS) layer protocol.

Although techniques using, and apparatuses for a UE limited-service mode are described, it is to be understood that the subject of the appended claims is not necessarily limited to the specific features or methods described. Rather, the specific features and methods are disclosed as example ways in which a UE limited-service mode can be implemented.

EXAMPLES

The following paragraphs recite several examples:

Example 1: A method performed by a UE wirelessly attached to a base station using a first set of resources of an air interface, the method comprising: determining, by the UE, that a condition that is local to the UE violates a threshold; transmitting, by the UE and to the base station, a first message that requests to enter a UE limited-service mode; and receiving, by the UE and from the base station, a second message including a limited-service radio network temporary identifier that identifies an allocated second set of resources of the air interface and directs the UE to: enter the UE limited-service mode; and wirelessly communicate with the base station (120) using the allocated second set of resources of the air interface (302).

Example 2: The method as recited by example 1, wherein the condition is a thermal, power, or battery condition.

Example 3: The method as recited by example 1 or example 2, wherein the first message is transmitted in accordance with a non-access stratum layer protocol.

Example 4: The method as recited by any of examples 1 to 3, wherein the first set of resources and the allocated second set of resources are resources of a control channel, the allocated second set of resources having a smaller frequency bandwidth than the first set of resources.

Example 5: The method as recited by any of examples 1 to 3, wherein the first set of resources and the allocated second set of resources are resources of a transport channel, the allocated second set of resources having a smaller frequency bandwidth than the first set of resources.

Example 6: The method as recited by any of examples 1 to 5, wherein the second message includes a numerology and a waveform format for use by the UE and the base station after the UE enters the UE limited-service mode.

Example 7: The method as recited by example 6, wherein the numerology corresponds to a Fast Fourier Transform size that becomes smaller upon the UE entering the UE limited-service mode.

Example 8: The method as recited by any of examples 1 to 7, wherein the second message includes an identity of at least one beam for wireless communications between the UE and the base station after the UE enters the UE limited-service mode.

Example 9: The method as recited by example 1, wherein the second message includes an allocated random access channel sequence and directs the UE to enter the UE limited-service mode utilizing a contention-free random access channel using the allocated random access channel sequence.

Example 10: A method performed by a base station wirelessly attached to a UE using a first set of resources of an air interface, the method comprising: receiving, by the base station and from the UE in response to the UE determining that a condition that is local to the UE violates a threshold, a first message indicating a request by the UE to enter a UE limited-service mode; allocating, by the base station, a second set of resources of the air interface to be used between the UE and the base station upon the UE entering the UE limited-service mode; and transmitting, by the base station and to the UE, a second message that includes a limited-service radio network temporary identifier that identifies the allocated second set of resources of the air interface and that directs the UE to: enter the UE limited-service mode; and wirelessly communicate with the base station using the allocated second set of resources of the air interface.

Example 11: The method as recited by example 10, wherein the second message includes an identity of at least one beam that is wider than at least one beam associated with the first set of resources.

Example 11: The method as recited by example 10, wherein the second the second message includes an allocated random access channel sequence and directs the UE to enter the UE limited-service mode utilizing a contention-free random access channel in accordance with the allocated random access channel sequence.

Example 13: The method as recited by any of examples 10 to 12, wherein the second message includes a numerology and waveform format for use between the user equipment and the base station after the UE enters the UE limited-service mode.

Example 14: The method as recited by example 13, wherein the waveform format has a peak-to-average ratio that reduces power consumption by the UE.

Example 15: A UE comprising: a processor and a computer-readable storage media, the computer-readable storage media comprising a service-mode manager having instructions that, upon execution by the processor, direct the UE to perform any method of examples 1 to 9.

What is claimed is:

1. A method performed by a user equipment wirelessly attached to a base station using a first set of resources of an air interface, the method comprising:
   determining, by the user equipment, that a condition that is local to the user equipment violates a threshold;
   transmitting, by the user equipment and to the base station, a first message that requests to enter a user equipment limited-service mode; and
   receiving, by the user equipment and from the base station, a second message including a numerology and a waveform format for use by the user equipment and the base station after the user equipment enters the user equipment limited-service mode and a limited-service radio network temporary identifier that identifies an allocated second set of resources of the air interface and directs the user equipment to:
   enter the user equipment limited-service mode; and
   wirelessly communicate with the base station using the allocated second set of resources of the air interface.

2. The method as recited by claim 1, wherein the condition is a thermal, power, or battery condition.

3. The method as recited by claim 1, wherein the first message is transmitted in accordance with a non-access stratum layer protocol.

4. The method as recited by claim 1, wherein the first set of resources and the allocated second set of resources are resources of a control channel, the allocated second set of resources having a smaller frequency bandwidth than the first set of resources.

5. The method as recited by claim 1, wherein the first set of resources and the allocated second set of resources are resources of a transport channel, the allocated second set of resources having a smaller frequency bandwidth than the first set of resources.

6. The method as recited by claim 1, wherein the numerology corresponds to a Fast Fourier Transform size that becomes smaller upon the user equipment entering the user equipment limited-service mode.

7. The method as recited by claim 1, wherein the second message includes an identity of at least one beam for wireless communications between the user equipment and the base station after the user equipment enters the user equipment limited-service mode.

8. The method as recited by claim 1, wherein the second message includes an allocated random access channel sequence and directs the user equipment to enter the user equipment limited-service mode utilizing a contention-free random access channel using the allocated random access channel sequence.

9. A method performed by a base station wirelessly attached to a user equipment using a first set of resources of an air interface, the method comprising:
   receiving, by the base station and from the user equipment in response to the user equipment determining that a condition that is local to the user equipment violates a threshold, a first message indicating a request by the user equipment to enter a user equipment limited-service mode;
   allocating, by the base station, a second set of resources of the air interface to be used between the user equipment and the base station upon the user equipment entering the user equipment limited-service mode; and
   transmitting, by the base station and to the user equipment, a second message that includes a numerology and waveform format for use between the user equipment and the base station after the user equipment enters the user equipment limited-service mode and a limited-service radio network temporary identifier that identifies the allocated second set of resources of the air interface and that directs the user equipment to:
   enter the user equipment limited-service mode; and
   wirelessly communicate with the base station using the allocated second set of resources of the air interface.

10. The method as recited by claim 9, wherein the second message includes an identity of at least one beam that is wider than at least one beam associated with the first set of resources.

11. The method as recited by claim 9, wherein the second message includes an allocated random access channel sequence and directs the user equipment to enter the user equipment limited-service mode utilizing a contention-free random access channel in accordance with the allocated random access channel sequence.

12. The method as recited by claim 9, wherein the waveform format has a peak-to-average ratio that reduces power consumption by the user equipment.

13. A user equipment comprising:
   a processor and a computer-readable storage media, the computer-readable storage media comprising a service-mode manager having instructions that, upon execution by the processor, direct the user equipment to:
   determine that a condition that is local to the user equipment violates a threshold;
   transmit, to a base station, a first message that requests to enter a user equipment limited-service mode; and
   receive from the base station, a second message including a numerology and a waveform format for use by the user equipment and the base station after the user equipment enters the user equipment limited-service mode and a limited-service radio network temporary identifier that identifies an allocated second set of resources of an air interface and directs the user equipment to:
   enter the user equipment limited-service mode; and wirelessly communicate with the base station using the allocated second set of resources of the air interface.

14. The user equipment of claim 13, wherein the condition is a thermal, power, or battery condition.

15. The user equipment of claim 13, wherein the first message is transmitted in accordance with a non-access stratum layer protocol.

16. The user equipment of claim 13, wherein a first set of resources and the allocated second set of resources are resources of a control channel, the allocated second set of resources having a smaller frequency bandwidth than the first set of resources.

17. The user equipment of claim 13, wherein a first set of resources and the allocated second set of resources are resources of a transport channel, the allocated second set of resources having a smaller frequency bandwidth than the first set of resources.

18. The user equipment of claim 13, wherein the numerology corresponds to a Fast Fourier Transform size that becomes smaller upon the user equipment entering the user equipment limited-service mode.

19. The user equipment of claim 13, wherein the second message includes an identity of at least one beam for wireless communications between the user equipment and the base station after the user equipment enters the user equipment limited-service mode.

20. The user equipment of claim 13, wherein the second message includes an allocated random access channel sequence and directs the user equipment to enter the user equipment limited-service mode utilizing a contention-free random access channel using the allocated random access channel sequence.

* * * * *